US005985454A

United States Patent [19]
McMordie et al.

[11] Patent Number: 5,985,454
[45] Date of Patent: Nov. 16, 1999

[54] ANTI-FOULING COATING FOR TURBOMACHINERY

[75] Inventors: Bruce G. McMordie, Perkasie; Mark F. Mosser, Perkiomenville, both of Pa.

[73] Assignee: Sermatech International Incorporated, Limerick, Pa.

[21] Appl. No.: 08/949,812

[22] Filed: Oct. 14, 1997

Related U.S. Application Data

[63] Continuation of application No. 08/428,543, Apr. 25, 1995, abandoned, which is a continuation-in-part of application No. 07/861,328, Mar. 31, 1992, Pat. No. 5,409,970, which is a division of application No. 07/475,353, Feb. 5, 1990, Pat. No. 5,116,672.

[51] Int. Cl.$^6$ .............................. B32B 5/16; B32B 15/02; B32B 27/00
[52] U.S. Cl. .......................... 428/413; 428/418; 428/461; 428/463; 428/469; 428/472.3; 428/472.2; 428/457; 428/458
[58] Field of Search ...................................... 428/413, 457, 428/458, 418, 461, 463, 469, 472.3, 472.2

[56] References Cited

U.S. PATENT DOCUMENTS

| | | | |
|---|---|---|---|
| 3,248,251 | 4/1966 | Allen | 428/559 |
| 3,869,298 | 3/1975 | Brumbaugh . | |
| 4,097,445 | 6/1978 | Martins et al. . | |
| 4,252,707 | 2/1981 | Ruid . | |
| 4,311,615 | 1/1982 | Taylor et al. | 252/514 |
| 4,532,289 | 7/1985 | Mosser et al. | 524/406 |
| 4,537,632 | 8/1985 | Mosser . | |
| 4,554,213 | 11/1985 | Marini . | |
| 4,606,967 | 8/1986 | Mosser . | |
| 4,617,056 | 10/1986 | Mosser . | |
| 4,650,819 | 3/1987 | Nakamoto et al. . | |
| 4,659,613 | 4/1987 | Mosser et al. . | |
| 4,675,350 | 6/1987 | Marchetti et al. | 523/414 |
| 4,711,916 | 12/1987 | Hagiwara et al. . | |
| 4,724,172 | 2/1988 | Mosser et al. . | |
| 4,806,161 | 2/1989 | Fabiny et al. . | |
| 4,886,626 | 12/1989 | Cope et al. | 252/500 |
| 4,889,558 | 12/1989 | Mosser | 428/457 |
| 5,116,672 | 5/1992 | Mosser et al. | 428/328 |
| 5,242,488 | 9/1993 | Stetson et al. . | |
| 5,279,650 | 1/1994 | Stetson et al. . | |

OTHER PUBLICATIONS

Lewis, "Hawley's Condensed Chemical Dictionary", 12th ed. Van Nostrand Reinhold Co., New York, p. 946 (1993).
Webster's II, New Riverside University Dictionary, The Riverside Publishing Co. p. 916 (1984).
AMOCO Amide–Imide Polymers, Amoco Chemical Corporation, Bulletin AM–1 (15pp.). Cited by applicant in parent Serial No. 07/475,353, rec'd Nov. 26, 1993.
Corrosion Science, vol. 26, No. 9, pp. 727–734, 1986, Mansfeld et al., Evaluation of Corrosion Protection Measures for Metal Matrix Composites.
Magnesium Elektron, Ltd., Brochure, pp. 3–14, Surface Treatments for Magnesium Alloys in Aerospace & Defence.
Amax Magnesium document (34 pp.) Corrosion and Protection of Magnesium.
M. F. Mosser, "An Improved Coating Process for Steel Compressor Components — Sermatel Process 5380 DP", SAE Technical Paper Series, 24th Annual Aerospace/Airline Plating & Metal Finishing Forum & Exposition, Phoenix, Arizona, Apr. 4–7, 1988.
Ronald Chow, Bruce McMordie, and Richard Wiegand, "Performance Maintenance of Centrifugal Compressors through the Use of Coatings to Reduce Hydrocarbon Fouling", *Elliot Company,* Reprint: R–264, (1994).
Lee et al., "Handbook of Epoxy Resins", *McGraw–Hill Book Co.,* New York, NY, pp. 2/4 & 4/59.
Department of Navy (MIL–M–45202B, Oct. 1968) document (35 pp.), Military Specification–Magnesium, Alloys and Anodic Treatment of.
Ministry of Technology (D.T.D. 911DC, May 1963) (7 pp.), Process Specification–Protection of Magnesium–Rich Alloys Against Corrosion.
Amoco Chemical Corporation, Bulletin AM–1 (15 pp.), Amoco Amide–Imide Polymers.

*Primary Examiner*—Donald R. Wilson
*Attorney, Agent, or Firm*—Weiser and Associates, P.C.

[57] ABSTRACT

Multilayered coatings comprising a sacrificial primer layer, a non-sacrificial second layer, and a polymer topcoat are disclosed.

12 Claims, 1 Drawing Sheet

ANTI-FOULING COATING FOR TURBOMACHINERY

This application is a continuation of application Ser. No. 08/428,543 filed Apr. 25, 1995, now abandoned, which is a continuation-in-part of Ser. No. 07/861,328, filed Mar. 31, 1992 (the "parent" application), which application issued as U.S. Pat. No. 5,409,970 on Apr. 25, 1995 and which is a divisional application of Ser. No. 07/475,353, filed Feb. 5, 1990, which issued as U.S. Pat. No. 5,116,672 on May 26, 1992.

FIELD OF THE INVENTION

The present invention relates to coatings that control fouling that would otherwise compromise the efficiency of turbomachinery devices.

BACKGROUND AND INDUSTRIAL PROBLEMS

Turbomachinery devices extract energy from moving fluids (air, combustion gases, water, steam, etc.) or impart energy to those fluids. Under certain conditions, solid material can deposit from the fluids moving through the turbomachinery. At the very least, these deposits, generally referred to as fouling, compromise efficiency by roughening aerodynamic surfaces. In the extreme, fouling deposits can grow to fill internal passages, throttling flow.

The precise nature of the deposits fouling a device will vary with the composition of the gas flow. For example, organic polymers can deposit within units handling hydrocarbon gases, while inorganic crusts form within turbomachinery operating on wet steam. In any case, efficiency is lost through three basic mechanisms:

Increased friction against gas flow, reduction of flow path cross-sectional area, and random changes of pressure distribution on airfoil.

Polymerization is one type of fouling that plagues centrifugal compressors pumping hydrocarbons in the process chemical and petrochemical industries. These chemical compressors deliver gases at volumes, pressures and temperatures critical to large scale chemical processes.

A centrifugal compressor acts on gas by means of a bladed impeller. The rotating impeller imparts a centrifugal force on the process gas resulting in an increase of both its tangential and radial velocity. The velocity's tangential component is then converted into an increase in pressure in the diffuser passage of the diaphragm. The important individual aerodynamic components of a multi-state centrifugal compressor include the inlet nozzle, inlet guide vanes, impeller, radial diffuser, return channel, collector volute and discharge nozzle.

The inlet nozzle accelerates the gas stream into the guide vanes which distribute the flow evenly to the first stage impeller. The rotating impeller forces the gas into the diffuser formed by stationary components called diaphragms. The diffuser reduces gas velocity and converts kinetic energy in the stream into higher pressures. Because gas flows through the diffuser in a spiral manner, it needs to be straightened before it enters the next impeller stage. This is done by the use of return channel vanes which are also part of the diaphragm assembly. It should also be noted that due to the pressure rise that is generated, the diaphragm is a structural, as well as an aerodynamic component. The collector volute and discharge nozzle reduce gas velocity prior to discharge.

Polymerization fouling of aerodynamic hardware in centrifugal compressors pumping hydrocarbons reduces operating efficiencies and component reliability. Though this problem has been known for years, relatively little work has been done to understand it and devise ways to minimize its impact. The most probable reason for its lack of attention is that fouling alone usually does not lead to a catastrophic machine malfunction or unscheduled downtime and can generally be handled by shortened maintenance intervals, where components are cleaned by removing accumulated polymer, returned to near original operating condition, and put back into service. These operations cause loss of efficiency.

Polymerization is not well understood, as it applies to compressor fouling. What is known is that the hydrocarbons which are inherent to the process gas or formed during the compression process can bond tenaciously to the component base metals and lead to significant performance loss of the machine. Deposits of this type have been found in compressors used for hydrocarbon processing, coke gas blowers, and other units where the gas contains sufficient amounts of hydrocarbons under conditions of high pressure and temperature.

Factors found to be critical to polymerization/fouling are: temperature—polymerization usually occurs above about 194° F. (90° C.), pressure—the extent of fouling is proportional to pressure level, surface finish—the smoother the surface the less apt the component is to foul, and gas composition—fouling is proportional to concentration of reactable hydrocarbon in the process (inlet gas).

In general, fouling has many detrimental effects on centrifugal compressors. One is build-up of material on the rotor. This build-up can lead to an unbalance which gradually builds until the unit exceeds its allowable vibration limit and has to be shutdown. Operating with significant rotor unbalance can also lead to fatigue and a reduction in component life. Fouling has also been known to reduce axial and radial clearances between the rotor and stationary components which leads to abrasive wear that severely damages impellers and labyrinth seals.

These types of fouling degradation are typical of a progressive formation of a deposit. Costs associated with correcting these problems usually show up after relatively long periods of operation.

However, polymerization fouling can occur so rapidly that efficiency losses occur very quickly, sometimes only months after start-up. In these cases, the most intense growth of deposit occurs during the first 50–200 hours of operation. The deposits affect stationary flow path components, as well as rotating elements. Prior attempts to correct the problem were limited to diffuser and return channels, stationary flow path components, which were considered to be the most susceptible to fouling. It was assumed the rotating element would be less likely to foul due to the dynamic force applied to the deposits by rotation. In addition, by design, the stationary flow paths exhibit slightly rougher surface finishes than the rotating element which make them more susceptible to deposit build-up.

A different sort of fouling afflicts steam turbines. These devices extract work from steam supplied from an external source (boiler or process vessel). Steam, superheated under very high pressures, enters the turbine and undergoes a controlled expansion as it passes over moveable and stationary airfoils (blades and vanes). The force of the expanding stream causes the blades to rotate, doing work. As the steam expands, its temperature and pressure decrease until, in later stages of the turbine, conditions are such that it spontaneously condenses on gas path surfaces.

The boundary between conditions of pressure and temperature in the steam turbine that allow condensation and those that do not is called the Wilson Line. Hardware operating well below the Wilson Line temperature and pressure will be wet. Components well above this temperature and pressure will remain dry. Since the Wilson Line will move within the turbine as operating conditions and condition of the inlet steam vary, some hardware will be alternately wetted and dried in service.

When condensation occurs, impurities carried by or dissolved within the steam precipitate and deposit on the metal surfaces. The rough hard crust which forms compromises operating efficiency in the same manner that polymerization deposits compromise centrifugal compressors. Frictional resistance to gas flow is increased, cross-sectional area available for flow is reduced, and variable pressure distributions are introduced in the unit.

In addition to loss of efficiency, fouling in steam turbines also increases the risk of corrosion damage of components. Condensing steam is an electrolyte that can initiate galvanic corrosion on a surface. This condition is exacerbated by sulfur and heavy metals, dissolved in incoming steam, which precipitate as hygroscopic salts on airfoils. When operating conditions change and steam again condenses on these dried salts, extreme pH conditions (highly acidic for deposits of acid salts, highly basic for basic salts) results immediately adjacent to the deposits. Severe corrosion, including pitting type corrosion, can result. Such corrosion not only roughens airfoil surfaces, but also compromises the mechanical integrity of the component.

Corrosion fouling is not limited to steam turbines. A similar type of fouling can occur in centrifugal compressors when there is significant moisture in the process gas stream. Water that condenses from that gas collects on compressor components, leading to aqueous corrosion.

Some attempts have been made to address and solve these industrial problems. To limit loss of efficiency due to fouling turbomachinery, various coatings have been formulated to coat gas path surfaces. It is desired that such a coating should have at least seven characteristics as follows: be smooth, non-stick, unreactive, non-wetting, thin (less than 250 $\mu$m or 0.010 inches thick), adherent, and be stable up to 260° C. (500° F.).

Several organic coating resins, including fluorocarbons such as polytetrafluoroethylene (PTFE), fluorinated ethylene propylene (FEP), and perfluoroalkoxy resins (PFA), or polyphenylene sulfides (PPS), are known to form smooth, unreactive, non-stick, non-wetting, thin films. However, coatings of these polymers cannot be used on turbomachinery because the non-stick materials do not remain bonded to iron, steel and nickel alloy turbomachinery components in service. Additionally, several of these fluorocarbons require a very high curing temperature, about 700° F. (371° C.) for PPS and PTFE, which may adversely affect the mechanical properties of the blades of the turbomachinery. Adhesion can be improved by priming the metal with a mixture of resin particles in an epoxy or other resin with a greater affinity for steels. Better yet, a primer combining polymer particles in a chromic acid slurry can be applied before the resin film. However, such coatings have not proven to be satisfactory as no such coating system adheres completely, and moisture permeating the film corrodes the metal surface below.

Aluminum-filled inorganic phosphate overlay coatings have been used to combat corrosion and erosion of steel components in turbomachinery for over 25 years. The basic coating of this type has been described in U.S. Pat. No 3,248,251 (Allen). These coatings are complex water-based slurries containing aluminum powder or alloy pigment particles dispersed in an acidic solution containing phosphates and hexavalent chromium ions which, upon exposure to heat and curing, transform to an insoluble metal/ceramic composite. Chromates (or dichromates), molybdates, vanadates, tungstates and other ions may be present. Commercial examples of such a material include Alseal® 500 and 518 manufactured by Coatings for Industry (Souderton, Pa.), CT33 manufactured by Corrotherm Inc. (Croydon, Pa.), and SermeTel W® and 962 manufactured by Sermatech International Inc. (Limerick, Pa.). These materials continue to be used in a wide variety of aerospace, automotive and industrial applications. Coating compositions of this type containing hexavalent chromium and phosphate are described in U.S. Pat. Nos. 3,248,249; 3,248,250; 3,395,027; 3,869,293; 4,537,632; 4,544,408; 4,548,646; 4,606,967; 4,617,056; 4,650,699; 4,659,613; 4,683,157; 4,724,172; 4,806,161; 4,863,516; 4,889,558; 4,975,330; 5,066,540; 4,319,924 and 4,381,323, each of which (including the patent to Allen) are incorporated herein by reference.

After such a slurry has been applied to a metal surface, usually by conventional air-atomized spraying, it is heated to a temperature between 500 to 1000° F., preferably to about 343° C. (650° F.) until cured. At these temperatures, the phosphates and any other modifying ions, such as dichromates, undergo a series of chemical reactions to produce an inorganic amorphous glass matrix between the aluminum pigmentation and between the coating and the substrate. Once cured, the structure is frequently referred to as a "ceramic", is water insoluble, and is tightly bonded and very adherent. Tensile bond strengths of an aluminum-filled chromate/phosphate on carbon steel typically exceed 55 MPa (8,000 psi).

Each aluminum particle in the coating is discretely separate from its neighbors. This discrete separation, visible in the photograph, makes this coating a poor barrier and, though it contains about between 60–80%, or preferably about 70%, by weight aluminum, this coating is not electrically conductive.

Sacrificial or "galvanic" electrically conductive coatings prevent corrosion by corroding in the place of the substrate. When a metal that reacts more quickly in a particular environment (a more "active" metal) is placed into contact with one that reacts more slowly (a more "noble" metal), the active metal will be entirely consumed by the environment before the more noble material beings to corrode. A more galvanically active metal will corrode to protect a less galvanically active metal it when placed in a saline environment. The more active metal is said to "sacrifice" itself for the more noble one.

A number of engineering coating systems are built around the sacrificial principle. Galvanizing and zinc plating, for example, use layers of active zinc to sacrificially protect steels. Even if the sacrificial zinc layer is damaged, the active metal in the coating around the exposed substrate corrodes, halting corrosion of that substrate metal.

Inorganic phosphates that are filled with pure aluminum powder are galvanically sacrificial when they are electrically conductive. Such coatings can be made electrically conductive by thermal or mechanical post treatments. Heating the aluminum/phosphate glass composite to about 538° C. (1000° F.) causes the aluminum pigment and glass to react and form a semiconductor, AlP and the coating layer becomes conductive. Electrical resistivity of the coating heated in this manner will drop to less than 15 ohms when measured with probes 1" apart. The same conductivity can be achieved by lightly blasting the coated surface with abrasive grit or glass beads. And when the aluminum-filled inorganic phosphate is electrically conductive, it is also galvanically sacrificial.

For some years it has been known to apply polymer films directly on sacrificial aluminum inorganic phosphate primers. However, in service, the life of these systems on turbomachinery has always been compromised by spontaneous delamination of the polymer film from the primer.

These failures were caused by corrosion products which formed at the interface between the primer and polymer sealer. It had also been known to apply the polymer film directly onto the steel substrate material. Again, catastrophic failure occurred due to corrosion undercutting the film and delamination. During service, moisture would permeate even the best organic sealers. Corrodants dissolved in this condensate would react with sacrificial aluminum-filled basecoat. Sacrificial products (like aluminum hydroxide) would form on the primer underneath the topcoat. As these products accumulated, the topcoat tends to blister and peel from the surface. This is especially true in the high stress, high erosion environment of turbomachinery.

The parent application discloses a coating well suited to the coating of this invention which comprises a mixture of polyamide-imide, or epoxy/polyamide-imide, an ion reactive pigment and a leachable pigment, which coating corresponds to the third layer of the four layer coating of the invention.

SUMMARY OF THE INVENTION

The present invention relates to a composition of matter that is, a multilayered coating to control and to limit fouling of gas path metal surfaces that would otherwise compromise the efficiency of turbomachinery.

The coating of this invention overcomes the limitation inherent in non-stick resin films by positioning an aluminum-filled inorganic phosphate or silicate sacrificial primer between a polymer coating and the ferrous, nickel-base or other metallic turbomachinery component.

The coating of this invention, comprising a passive inorganic binder layer between a sacrificial inorganic layer and an organic layer, overcomes the problem of delamination at the interface between the inorganic and organic layers of coatings used to prevent fouling and corrosion in turbomachinery.

Although reference in the invention is made to turbomachinery, it is contemplated that the coating of the invention is also useful to protect other metal surfaces which are exposed to conditions similar or less demanding to those to which the turbomachinery is exposed.

The resulting composite coating system, comprising a smooth, continuous organic film possessing a low coefficient of friction over a stable primer, remains tightly bonded to the iron, steel, or nickel substrates under the mechanical stresses of high speed rotation, even in the presence of corrosive electrolytes. The coating of this invention is particularly suited, but not limited, to use on centrifugal compressors in hydrocarbon process gas streams and on steam turbine components operating below or near the Wilson Line.

One embodiment of the invention is a multi-layered coating for preventing fouling of turbomachinery. The first layer, which is in contact with the metal surface of the turbomachinery, is galvanically sacrificial and may or may not be conductive. This first layer preferably is an aluminum-filled ceramic which contains inorganic phosphate. The first layer may optionally contain additional additives, such as chromate or molybdate compounds, or the metal salts thereof. Alternatively to or in addition to aluminum, other particulate metals, such as copper, silver, or nickel or others listed in the Allen patent, may be included in the first layer. The first layer, in combination with the other components of the coating of the invention, limits aqueous corrosion in moist environments such as those within steam turbines.

In the coating of the invention, a second layer is provided which is in contact with the first layer. The second layer is non-conductive and non-sacrificial. To limit corrosion between the layers of the coating, it is essential that the second layer be non-conductive. In one embodiment, the second layer is an inorganic material, such as a phosphate or silicate binder, lacking metal pigments. The second layer may alternatively comprise metal particles, such as aluminum, and/or other metallic pigments. In addition, chromate or molybdate compounds, or the metal salts thereof, may be present. The second layer may consist of an inorganic layer comprising fine inert pigments not reactive in acid binders, like thermally stable pigment such as oxides of chromium ($Cr_2O_3$), iron (for example magnesium ferrite, $MgO.F_2O_3$), or aluminum, in a chromate/phosphate or silicate binder. Alternatively, the second layer may be produced by hydrolysis of an organometallic, such as aluminum isopropoxide, to produce an $Al_2O_3$ layer. The same modifications described above for the first layer apply to the second layer. When applied to the surface of the first conductive inorganic aluminum filled layer and cured, a continuous thin film of non-conductive glass forms, sealing the surface and creating the desired non-conductive surface. The non-conductive second layer may be produced on the sacrificial first layer by applying and curing a second coat of the same inorganic aluminum phosphate as in the first layer.

A third layer of an organic polymer sealer is provided which is in contact with the second layer. The third layer comprises a mixture of an organic polymer resin in an organic solvent, which mixture may be referred to as a paint. The resin bonds to the phosphate film of the second layer and, in a preferred embodiment wherein the second layer comprises particulate aluminum, anchors itself within the fine surface pores of the aluminum-filled second layer. In one embodiment, the organic polymer resin is polyamide-imide or epoxy/polyamide-imide. The paint may contain a variety of additives and/or pigments, and may contain more than one solvent. For example, the third layer may contain an ion reactive pigment and/or a leachable pigment. The third layer, in combination with the other components of the coating of the invention, results in a coating that is durable and will withstand the rigors of turbomachinery operation.

A fourth layer, or top layer, is in contact with the third layer. The fourth layer is provided which comprises, in a preferred embodiment, a mixture of polyamide-imide or an epoxy/polyamide-imide and a fluorocarbon resin, such as polytetrafluoroethylene ("PTFE") or fluorinated ethylene propylene ("FEP"), polyvinylidene fluoride, polytrifluorchloroethylene or other halogen-substituted, preferably fluoro-substituted hydrocarbon polymers.

In another embodiment, the invention is a multi-layered coating for preventing fouling of turbomachinery which comprises the first, second, and top layers described above, but which lacks the third layer.

Another embodiment of the invention is a metal part coated with the multi-layered coating of the invention. A metal substrate treated with the four-layer coating of the invention will remain substantially free from fouling and corrosion after years of operation of turbomachinery at operating temperatures, which typically are about 260° C. (500° F.). This protection also results from treatment with the three-layer coating of the invention.

Another embodiment is a method of coating a metal part with the multi-layered coating of the invention.

DETAILED DESCRIPTION OF A PREFERRED EMBODIMENT OF THE INVENTION

Coating of the Invention

Figure 1:
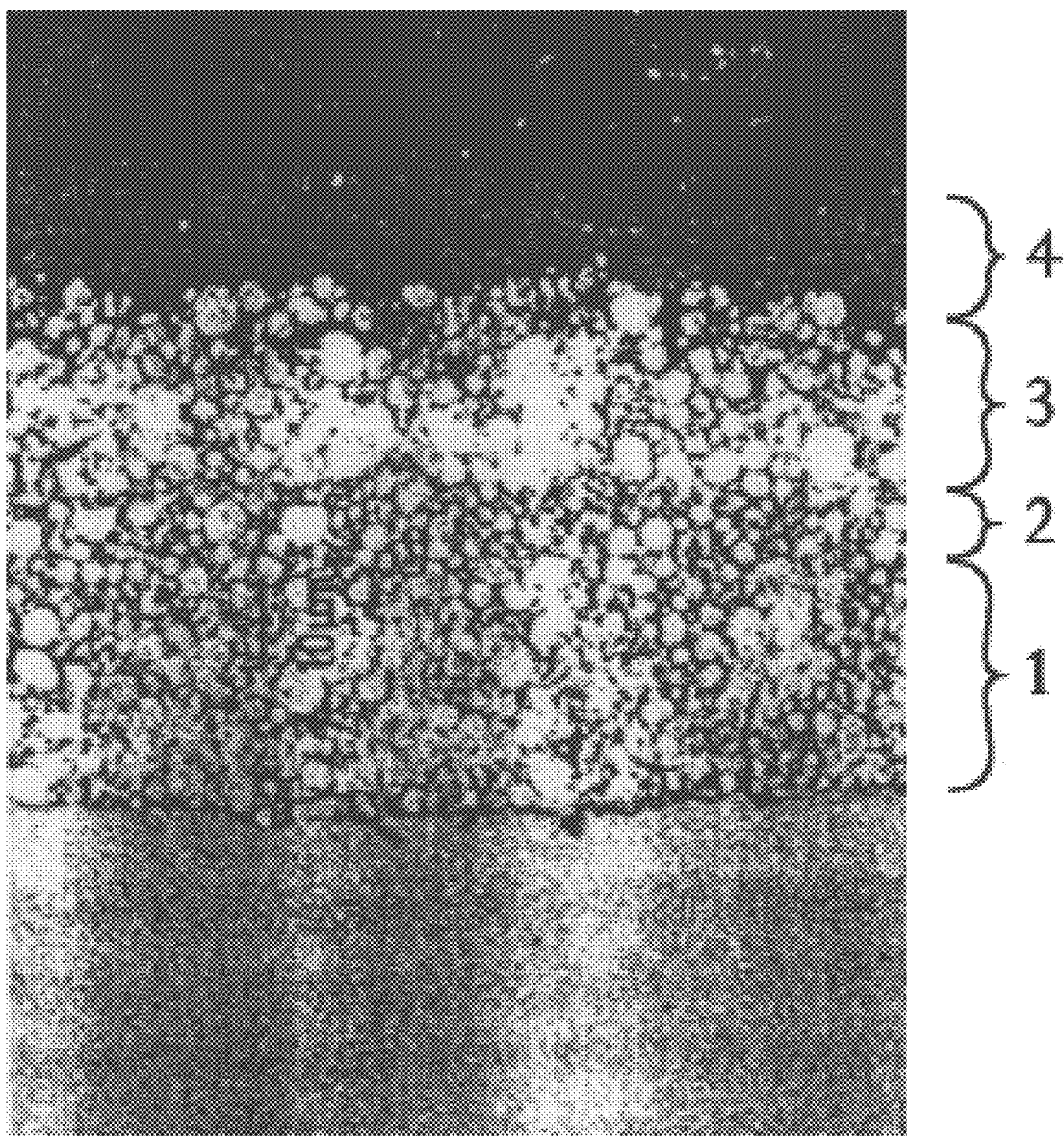
FIG. 1 shows a cross section of a preferred embodiment of the four layer coating of the invention on a steel substrate. The bottom layer 1 is a sacrificial, inorganic aluminum-phosphate primer. The second layer 2 is a non-sacrificial, inorganic aluminum-phosphate layer. The third layer 3 is a polyamide/imide layer containing aluminum, an ion reactive pigment and a leachable pigment. The fourth, top, layer 4 is a polyamide/imide mixture containing a particulate fluoropolymer. The three layer coating of the invention, containing the bottom layer 1, the second layer, 2, and the top layer 4, lacks the third layer 3.

The coating of the invention is a multi-layered coating which prevents fouling on metal surfaces in turbomachinery. In one preferred embodiment, the coating is a four layer coating.

FIG. 1 shows a cross section of a preferred embodiment of the coating of the invention. The first layer is a primer layer, preferably between about 0.00125 to 0.00175 inches thick (32–44 $\mu$m), in direct contact with and tightly bonded to the metal surface. This first layer preferably is an aluminum-filled ceramic which contains inorganic phosphate and either chromate, or dichromate, or molybdate compounds, or the metal salts thereof. The aluminum in the ceramic is preferably in the form of discretely separate particles. A typical suitable primer is described in Allen, U.S. Pat. No. 3,248,251, incorporated herein by reference. Other metals may be present in the primer, as disclosed in Allen. Although Allen discloses an ideal size of 325 mesh for the aluminum particulate matter, aluminum particles larger than 325 mesh are suitable for use in the coatings of the present invention.

The aluminum particles may also be in the form of flakes or as a spherical aluminum particles as disclosed for instance in U.S. Pat. No. 4,537,632.

Alternatively, the first layer may be an acidic phosphate/chromate in which trivalent chromium has been substituted for most or all of the hexavalent ion in the chromate/phosphate solution from which the coating is made such as disclosed in Wydra, U.S. Pat. No. 3,875,717, incorporated herein by reference. The first layer may also comprise an aluminum-ceramic formed from an acidic phosphate slurry from which hexavalent chromium or molybdate ions has been specifically excluded. Such coatings have been described in Stetson, et al. in U.S. Pat. Nos. 5,242,488 and 5,279,649, both of which are incorporated herein by reference.

Stetson, in '488, discloses forming a slurry by the addition of sufficient quantities of aluminum in a bonding solution to equilibrate and to render inert aluminum in the bonding solution with respect to subsequent additions of aluminum. In this way, the need for environmentally toxic molybdenum or chromium to inhibit the oxidation of metallic aluminum is obviated. The slurry may optionally contain magnesium. In '649, Stetson discloses that small amounts of vanadium are necessary in the slurry. The first layer of the coating of the present invention, devoid of molybdenum or chromium, may be formed in this way; however, it may also be formed without equilibrating the aluminum, as required by Stetson.

The first layer is galvanically sacrificial, that is, it is more active than the underlying substrate and will corrode in place of the less active, more noble substrate. Thus, the sacrificial layer will protect the substrate by corroding completely before the substrate begins to corrode. The inorganic phosphates and aluminum primer layer can be made galvanically sacrificial by making it electrically conductive.

Alternatively, the first layer may be an inorganic phosphate primer that is galvanically sacrificial, but not electrically conductive. An example of such a suitable primer, comprising an inorganic coating containing finely divided particulate aluminum alloys, particularly alloys containing magnesium, is described in Brumbaugh, U.S. Pat. No. 3,869,293, incorporated herein by reference. Because the primers of the type described in U.S. Pat. No. 3,869,293 contain elements which are less noble than those found within the substrate, they are galvanically sacrificial, even without being made conductive. Other suitable sacrificial but non-conductive phosphate primers may contain alloys of aluminum and other active metals.

Primers containing high levels of zinc, are generally not considered suitable for the coating of this invention when used at high operating temperatures. Zinc is highly reactive, and may thus cause catalysis of chemicals in the process gas stream of turbomachinery. Further, zinc has a relatively low melting point of 293° C. (560° F.). Because there is significant diffusion of metals at temperatures above 0.8 of their liquidus temperature, a primer having high levels of zinc would be limited to continuous operating temperatures of the equipment below about 149° C. (300° F.).

The second layer of the coating of the invention is an inorganic phosphate containing layer, preferably between about 0.00125 to 0.00175 inches thick (32–44 $\mu$m), which may optionally comprise aluminum, chromate, or dichromate, or molybdate compounds, or the metal salts thereof. In accordance with the invention, the first and second layers may contain common components, although the concentrations and amounts of the components may differ between the layers. Alternatively, the components of the first and second layer may differ. For example, the first layer may contain chromate compounds, whereas the second layer may contain molybdate compounds. The second layer may have any of the variants of the compositions as described above for the first layer. In addition, the first or second layer may contain components not present in the other layer. Although not an essential feature of the invention, in a preferred embodiment, the second layer has the identical composition as that of the first layer, the sole difference being that the first layer is sacrificial and the second layer is not. It is an essential feature of the invention that the second layer be non-conductive. The coating of the invention, comprising a non-conductive second layer between a sacrificial first layer and an organic polymer sealer layer, has been unexpectedly found to resist corrosion and delamination between the inorganic and organic layers of the coating.

The third layer of the coating is a passivating organic polymer coating which is applied to the surface of the non-conductive second layer. The organic polymer is selected to be smooth, non-stick, unreactive, and non-wetting. Preferably, the organic film is substantially impermeable to moisture and other liquids, especially at high operating temperatures, so as to improve resistance of the coating to intermittent immersion. In addition, an organic polymer is selected which is resistant to temperatures up to 260° C. (500° F.).

The third layer is a layer of a mixture of an organic polymer dissolved or in suspension in an organic or aqueous solvent. In a preferred embodiment, the organic polymer is a polyamide/imide or epoxy polyamide/imide. Alternatively, phenolic polymers may be used in place of the polyamide/imide. Other suitable polymers are disclosed in Mosser, U.S. Pat. No. 5,116,672, incorporated herein by reference. Classes of polymers (and copolymers thereof) suitable for use in the coating of the invention include preferably hydrophobic or hydrophilic polymers which are thermally stable at the operating temperatures of the turbomachinery. Such polymers may be thermosetting or thermoplastic, and include, but are not limited to, polyolefins, copolyolefins, ionomers, polyamides, copolyamides, halogenated polyolefins, polyesters, unsaturated polyesters, silicone polyesters, epoxy resin polymers, phenoxy (or phenolic) resins, alkyd resins, silicone alkyd resins and acrylic resins. Specific polymers suitable for use in the invention include but are not limited to the following: polyimide, polyethylene, polypropylene, polyphenylene sulfide, polyvinylidene fluoride, polyamide-imide, polyamide-imide (epoxy modified), polyurethane, ethylene copolymers, ethylene vinyl acetate copolymers, epoxy polyamide, polyvinyl chloride, polyvinyl fluoride, organosiloxane, polyvinylidene chloride, polystyrene, polyacrylonitrile, cellulose acetate, polytetrafluoroethylene, fluorinated ethylene propylene, and perfluoroalkoxy resins.

Preferably, the resin used will be able to be cured at a temperature about 450 to 500° F. or lower. In one preferred embodiment, the resin is a polyamide-amide resin mixed with an epoxy resin, which mixture can be cured at a temperature of about 300° F. (149° C.) or higher.

Solvents (or liquids to disperse the polymer) which are useful in accordance with the invention include but are not limited to aliphatic hydrocarbons, aromatic solvents, alcohols and other oxygenated solvents, substituted hydrocarbons, phenols, substituted aromatic hydrocarbons and halogenated aliphatic hydrocarbons. Each resin has, as in known in the art, a group of solvents and diluents compatible with the resin and suitable for film forming. In some cases, the organic solvent is used to disperse the resin powder. It is contemplated that water can be used as solvent/diluent or dispersant for certain resin pigment compositions.

The third layer may contain one or more ion reactive pigments consisting of particles of any suitable metal. Illustrative of the class of metals are aluminum, magnesium, zinc, cadmium and other alloys. Magnesium/aluminum alloys and alloys of the other above-mentioned metals are included. U.S. Pat. No. 4,537,632 to Mosser and the metallic powders listed therein are incorporated herein by reference.

The third layer may contain one or more leachable pigments consisting typically of a salt containing chromate, molybdate, vanadate, tungstate, plumbate, phosphate or metaborate as well as others as listed in the publication by Smith, entitled "Inorganic Primer Pigments", Federation Series on Coatings Technology published by Federation of Societies for Coating Technology, Philadelphia, Pa. (1988) which is incorporated herein by reference. The cation of the salt can be any cation which forms a salt with the above-mentioned ion and preferably a salt of limited solubility typically strontium, zinc, barium, potassium, sodium, calcium, lithium, magnesium.

A preferred leachable pigment is a chromate-containing pigment, preferably strontium chromate, although any of the leachable pigments disclosed in the above-identified Mosser patent are suitable, such as zinc chromate, zinc tetraoxychromate, zinc potassium chromate, barium chromate, and barium metaborate. The third layer is preferably between about 0.00125 to 0.00175 inches thick (32–44 $\mu$m).

It is not necessary that the third layer contain either one or both of the ion reactive pigment or the leachable pigment.

The fourth layer, which may be the top layer of the coating, comprises a mixture of an organic polymer in an organic solvent containing a fluorocarbon resin. Suitable fluorocarbon resins include polytetrafluoroethylene or fluorinated ethylene propylene. In a preferred embodiment, the organic polymer is epoxy/polyamide-imide, although any of the polymers described above for the third layer may be used as the polymer of the fourth layer. The specific nature of the top layer is not critical to the coating of the invention, except that it is essential that the polymer is thermally stable at operating temperatures of the turbomachinery.

In an alternative embodiment, shown in FIG. 2, the coating of the invention comprises the first, second, and top layers described above, but lacks the third layer.

The total thickness of the coating preferably is less than 150 $\mu$m (0.006 inches) so as not to reduce the cross sectional area available for gas flow, which would compromise the efficiency of the turbomachinery. The coating also remains tightly bonded to the substrate throughout operation, even in the presence of aqueous electrolytes. Adhesion is not compromised by impact of hard particles in the gas stream or by exposure to corrosive influences of the operating environments. Finally, owing to the excellent thermal stability of the coating, the coating of this invention can operate continuously for extended periods of time at up to 260° C. (500° F.) without loss of physical properties.

Although a three and four layer multi-layer coating is disclosed above, it will be understood by those skilled in the art that additional layers may be added to the coating, between the first and second layers, between the second and third or top layers, between the third and fourth layers, or above the top layers without departing from the invention, providing such additional layer(s) do not adversely affect the performance of the coating of the invention. The applicants rely on the doctrine of equivalents.

Method of the Invention

The coating of the invention may be applied to a metal part by the method of the invention as follows. A slurry primer, preferably containing aluminum powder or aluminum alloy pigment particles dispersed in an acidic solution of phosphates, is applied to the surface of the part. Other ions, such as chromates, molybdates, vanadates or tungstates may be present in the slurry. Application of the primer is preferably by conventional air-atomized spraying. Other suitable methods of application of the primer to the metal surface include painting, rolling, brushing, dip/spinning, or dipping.

Following application of the primer, the metal surface and the primer is cured by heating to a temperature sufficient to cause the phosphate and metal ions in the primer to produce an inorganic amorphous glass matrix between the aluminum pigment and between the primer and the surface to tightly bond the primer to the surface. During curing of each layer, the layer dries. In a preferred embodiment, the temperature is about 343° C. (650° F.). The primer is then allowed to cool.

If desired, the primer layer can be made electronically conductive by thermal or mechanical post treatments or any other suitable method. The primer layer may be heated to about 540° C. (1000° F.) which will cause the electrical resistivity of the coating heated in this manner will drop to less than 15 ohms when measured by with probes 1" apart. The same conductivity can be achieved by lightly blasting the coated surface with abrasive grit, glass beads, or alumina.

The second layer is applied as a slurry over the cured primer layer and is cured using methods described above for the first layer. The slurry for the second layer contains an acidic solution of phosphates or silicates. The slurry may contain dispersed aluminum powder or aluminum alloy pigment particles. Chromate or molybdate ions, as described above for the first layer, may be present in the slurry. The second and subsequent layers are not made electrically conductive.

A third layer is applied as an organic liquid composition over the cured second layer using methods described above as for the first and second layers. The liquid composition of the third layer contains a mixture a thermally stable organic polymer in an organic solvent. In a preferred embodiment, the polymer is polyamide-imide, epoxy/polyamide-imide, or polyvinylidene fluoride. The composition may contain an ion reactive pigment and/or a leachable pigment as described above. The third layer is heated at a temperature and time sufficient to cure and to crosslink the resins of the layer. In a preferred embodiment, the heat curing of the epoxy polyamide/imide is at about 149° C. (300° F.) to 190° C. (375° F.) for about 30 minutes. With a pure polyamide/imide resin, the cure temperature is at about 260° C. (500° F.).

The top layer, comprising a fluoropolymer in an organic polymer sealer, is applied over the cured third layer using methods described above as for the first, second, and third layers. In a preferred embodiment, PTFE is incorporated as finely divided particles in a resin matrix organic polymer sealer, such as a polyamide-imide or epoxy/polyamide-imide resin. The fourth layer is heated at a temperature and time sufficient to cure the resin matrix, as for the third layer. In a preferred embodiment using an epoxy/polyamide-imide resin, the heat curing is at about 149° C. (300° F.) to 190° C. (375° F.), or about 260° C. (500° F.) for a polyamide-imide resin, for about 30 minutes.

Alternatively, the coating may be applied omitting the third layer. The method of application of the first, second, and top layers is identical to that described above for the coating comprising the third layer.

The Coated Part of the Invention

In accordance with the invention, metal parts which benefit most from being coated with the composition taught in this application are those parts of machinery, particularly turbomachinery, which are exposed at high temperatures to gas flow and which, over time normally, become fouled by polymerization, steam condensation, or corrosion.

In a preferred embodiment, the coated metal part is an iron, steel, or nickel alloy machine component, particularly a turbomachinery component.

The following examples are illustrative of the invention and are not meant to be limiting. It is evident to one skilled in the art that the various coatings illustrated can be modified while being within the scope and contemplation of the invention.

EXAMPLE 1

A four layered embodiment of the coating of the invention was installed in a cracked gas compressor. At this plant, ethane is cracked to make ethylene and other hydrocarbon by-products. Historical performance data showed compressors fouled during operation. The operator washed the units with an oil solvent to minimize fouling, still it was desirable to further limit the problem.

The shaft and impellers were thermally degreased at 650° F. (343° C.), then blasted to a gray metal finish using aluminum oxide grit. After removing dust and residual grit, 1 to 1.5 mils (25 to 37 microns) of a commercial chromate containing aluminum-filled inorganic phosphate coating slurry, as disclosed in Allen '251, was sprayed onto the parts. After this coat was cured, the aluminum-filled inorganic phosphate primer was then lightly blasted with alumina grit until it became electrically conductive and sacrificial.

A second coat of 1 to 1.5 mils (25 to 37 microns) of this same coating was applied over this sacrificial layer. This second coat was cured, but not made conductive, to effectively "bury" the first sacrificial layer of aluminum-ceramic coating. Then a layer of a coating comprising finely divided aluminum and powdered strontium chromate chemical in a epoxy polyamide/imide resin binder, as described in Mosser (U.S. Pat. No. 5,116,672) was applied to complete the third layer of the coating system. This layer was cured at 375° F. (190° C.) for one-half hour.

Finally, the first three layers of the system were sealed with a sealer which comprises finely divided PTFE in the epoxy polyamide/imide resin matrix as described in '672. The sealer was cured for 30 minutes at 375° F. (190° C.). The total thickness of this system was 4.5 to 5.5 mils (115 to 140 microns), as measured by a magnetic coating thickness probe.

Performance of the compressor was monitored over the 17 months following installation of coating impellers. In that time, efficiency of the unit containing the articles of this invention remained virtually constant compared to a 6% reduction in efficiency during the previous run of the same duration without coating on the impellers.

EXAMPLE 2

A chemical plant operating near the Gulf of Mexico in the continental United States was using a steam turbine to drive centrifugal compressors in a process gas train. The steam turbine operated continuously for 16 years, during which time it was plagued by fouling by inorganic deposits from the steam.

At overhaul, the condensation stages of the unit steam turbine were coated with the coating of Example 1. The unit was returned to service, performance monitored and compared to its previous history. At start-up, the turbine was found to generate the same power as prior to overhaul while consuming 5% less steam. After 2 years in service, the turbine was still using 5% less steam than it had before overhaul to produce equivalent work. Boroscope inspection showed the coating of this invention remained intact on the coated components. These surfaces were largely clean and free from fouling deposits that had been seen before the coating was introduced.

Other illustrations of the coatings of the invention can readily be devised by one of skill in the art from the teachings presented herein.

EXAMPLE 3

A carbon steel panel was coated with the coating of Example 1, except that the epoxy polyamide/imide resin in the third and fourth layers was replaced with polyamide/imide resin. Because they lack the epoxy additives, these organic layers were cured at 260° C. (500° F.), instead of 190° C. (375° F.). The resulting coating was as smooth and as fouling and corrosion resistant as that in Example 1 and was harder and more erosion resistant.

EXAMPLE 4

A cast iron plate was cleaned and then blasted with clean aluminum oxide grit. An aluminum-filled chromate phosphate coating of the type described in Allen '251 was applied to the blasted steel surface and cured by heating the part for 30 minutes at about 343° C. (650° F.). This aluminum-filled ceramic coating was lightly blasted with alumina grit until it became electrically conductive. A slurry of the fine iron oxide and titanium oxide powders in a chromate/phosphate binder of the Allen type was then applied to seal and passivate the conductive aluminum-filled coating. This oxide-filled inorganic phosphate coating was cured 30 minutes at 343° C. (650° F.).

Subsequently, a primer layer comprising an epoxy amide-imide resin with aluminum and chromate pigment (described in Example 1) was applied onto the sealed, passivated aluminum coating. A final sealer comprising a mixture of PTFE in epoxy polyamide/imide resin (also described in Example 1), was applied over the organic primer layer. Both resin coatings were cured 30 minutes at 190° C. (375° F.).

The coated plate was placed in a fog of 5% salt spray per ASTM method B117. After 1500 hours, there was no red rust nor was there any evidence of blistering or delamination between the layers of materials in the coating.

EXAMPLE 5

A coil spring made of high strength low alloy steel was blasted with clean aluminum oxide grit. An aluminum-filled chromate phosphate coating of the type described in U.S. Pat. No. 4,537,632 (Mosser) was applied to the blasted steel surface and cured by heating the part at 190° C. (375° F.) for 24 hours. This aluminum-filled ceramic coating was lightly blasted with alumina grit until it became electrically conductive. A second layer of the slurry of Mosser '632 was applied over the first conductive coat and again cured 24 hours at 190° C. (375° F.).

Subsequently, a layer of epoxy polyamide/imide resin coating (as described in Example 1) was applied on the non-conductive aluminum-inorganic phosphate coating. A non-stick release coating, a mixture of PTFE in epoxy polyamide/imide resin (also described in Example 1), was applied over the aluminum/chromate pigmented resin coating. Both resin coatings were cured 30 minutes at 149° C. (300° F.).

The spring was placed in a fog of 5% salt spray per ASTM method B117. After 2500 hours there was no red rust nor was there any evidence of blistering or delamination between the layers of materials in the coating.

EXAMPLE 6

A carbon steel panel was coated with the coating of Example 1 except that the two final epoxy polyamide/imide layers were replaced with a single layer of polyphenylene sulfide (PPS) thermoplastic resin. A suspension of PPS resin powder in an aqueous polyol was sprayed onto the aluminum-filled inorganic phosphate coatings on the steel surface and allowed to dry. The coated part was then held at 370° C. (700° F.) for 35 minutes to sinter the resin. After 500 hours in 5% salt spray per ASTM method B117, the coated panel shows no red rust nor was there any evidence of blistering or delamination between the layers of materials in the coating.

EXAMPLE 7

A cast iron plate was cleaned and then blasted with clean aluminum oxide grit. An aluminum-filled chromate phosphate coating of the type described in Allen '251 was applied to the blasted steel surface and cured by heating the part for 30 minutes at about 343° C. (650° F.). This aluminum-filled ceramic coating was lightly blasted with alumina grit until it became electrically conductive. A second layer of aluminum-filled chromate phosphate was then applied over the conductive one. This layer was also cured 30 minutes at 343° C. (650° F.).

A primer layer, as described in Example 1 of Mosser, U.S. Pat. No. 4,5323,289, was applied on the cured aluminum-filled inorganic phosphate. This primer was a slurry of fine particles of polyvinylidene fluoride resin in a chromate/phosphate binder of the type described in Allen '251. This coating was cured 30 minutes at 260° C. (500° F.). A liquid slurry of polyvinylidene fluoride resin was then applied over the primer and cured to a uniform film at 288° C. (550° F.).

The coated plate was placed in a fog of 5% salt spray per ASTM method B117. After 1500 hours, there was no red rust nor was there any evidence of blistering or delamination between the layers of materials in the coating.

It will be understood that various changes in the details, materials, and arrangements of parts which have been herein described and illustrated in order to explain the nature of this invention may be made by those skilled in the art within the principle and scope of the invention as expressed in the following claims.

What is claimed is:

1. A coating which comprises
    a first cured layer of an adherent aluminum- or aluminum alloy-filled ceramic containing inorganic phosphate in contact with a surface, the first layer being either
    (1) filled with an aluminum alloy or a pure aluminum powder and having been made galvanically sacrificial and having an electrical resistance of less than 15 ohms measured with probes 1" apart,
    a second cured layer in contract with the first layer, which second layer contains an inorganic phosphate or silicate binder and finely divided aluminum or aluminum alloy powder which second layer is not galvanically sacrificial greater than 15 ohms measured with probes 1" apart, and
    a cured top layer which comprises a thermally stable organic polymer sealer.

2. The coating of claim 1 in which the first layer is filled with finely divided particulate aluminum alloy which layer is galvanically sacrificial to the metal surface without being made electrically conductive.

3. The coating of claim 1 in which the first layer has an electrical resistance of less than 15 ohms measured with probes 1" apart and is galvanically sacrificial due to a post-thermal or mechanical treatment.

4. The coating of claim 3 in which the galvanically sacrificial property of first layer is imparted by the mechanical treatment.

5. The coating of claim 3 in which the first layer has been subjected to a post-thermal treatment.

6. The coating of claim 2 in which the aluminum alloy is an aluminum-magnesium alloy.

7. The coating of claim 1 in which the first layer is between about 32 to 44 µm thick.

8. The coating of claim 1 in which the first layer contains a compound selected from the group consisting of chromate, molybdate, vanadate and tungstate, or the metal salts thereof.

9. The coating of claim 1 in which either or both of the first two inorganic layers are free of molybdenum and/or chromium salts.

10. The coating of claim 1 in which the second layer is between about 32 to 44 µm thick.

11. The coating of claim 1 in which the organic polymer sealer is selected from the group consisting of epoxy modified polyamide-imide, polyamide-imide, polyphenylene sulfide polytetrafluoroethylene, polyvinylidene fluoride, or fluorinated ethylene/propylene copolymer.

12. The coating of claim 1 wherein the coating comprises an additional, thermally stable organic polymer layer, which is sandwiched between the second and a cured top layer, and is of a different composition than the top layer.

* * * * *